July 21, 1959 E. ANDERSON ET AL 2,895,551
APPARATUS FOR MAKING CONTAINER CLOSURES
Filed Dec. 20, 1952 2 Sheets-Sheet 2
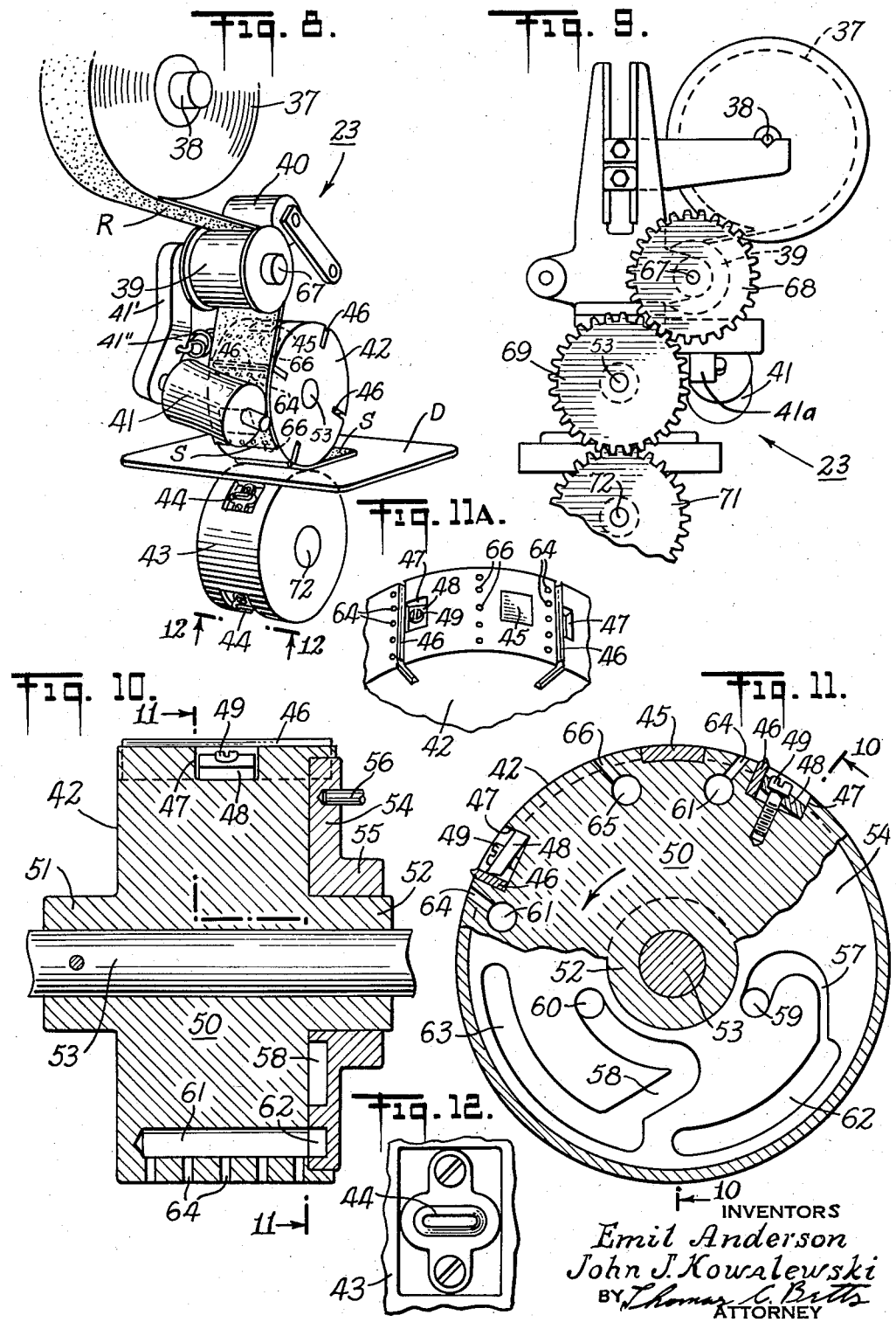
INVENTORS
Emil Anderson
John J. Kowalewski
BY Thomas C. Betts
ATTORNEY

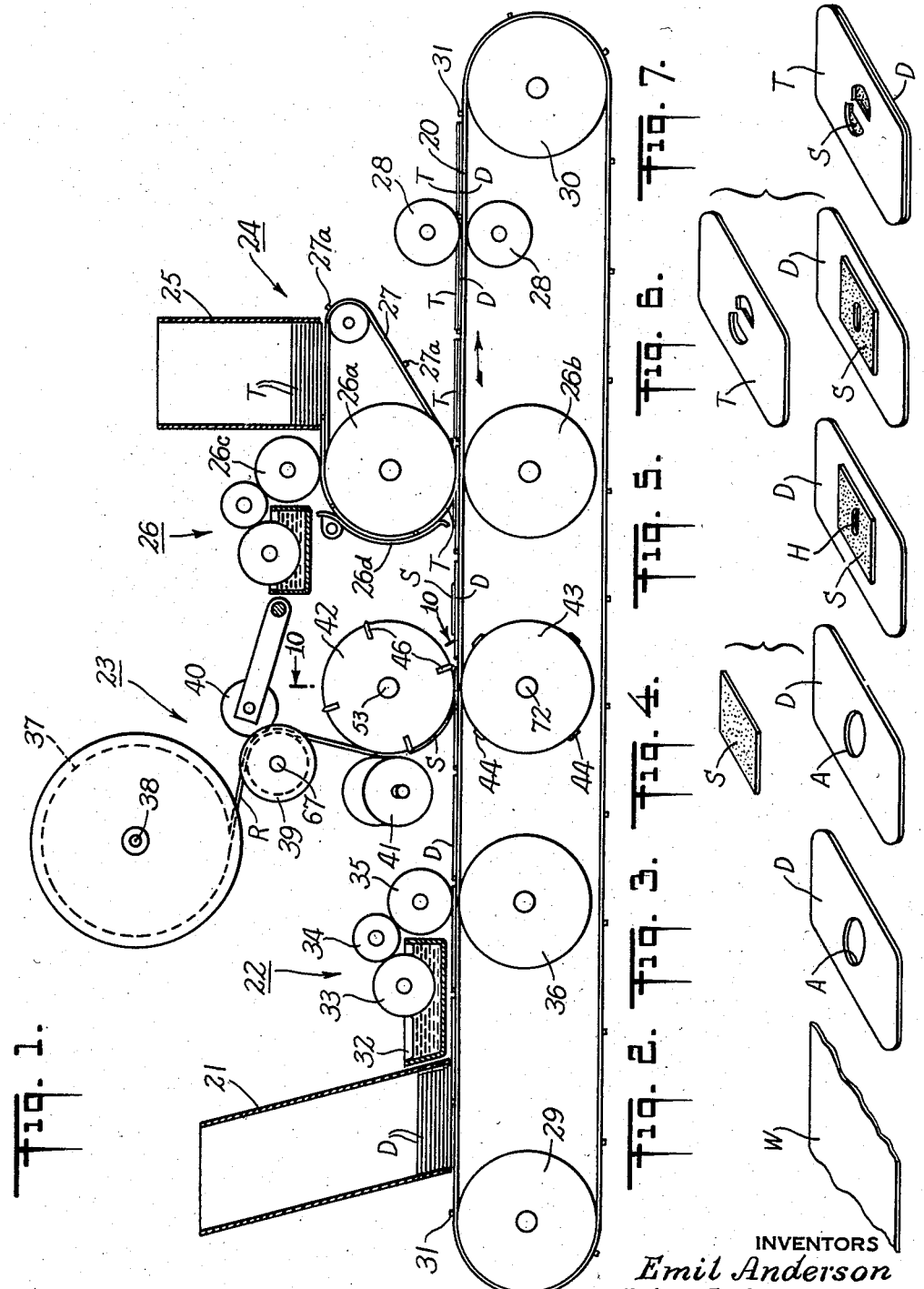

United States Patent Office 2,895,551
Patented July 21, 1959

2,895,551

APPARATUS FOR MAKING CONTAINER CLOSURES

Emil Anderson, Briarcliff Manor, and John J. Kowalewski, Bronx, N.Y., assignors to Electrolux Corporation, Old Greenwich, Conn., a corporation of Delaware Application December 20, 1952, Serial No. 327,132

1 Claim. (Cl. 164—68)

Our invention relates to an apparatus for making containers, more particularly disposable porous containers for use in a suction cleaner.

The practical utilization of disposable porous dust containers rather than the conventional cloth dust bag in suction cleaners is of relatively recent origin. Of even more recent origin is the concept of automatically ejecting such a container from the cleaner when the container loses its filtering efficiency by reason of its pores becoming so clogged as to preclude passage of air therethrough at an efficient rate. Where the container is to be ejected, it is desirable that some means be provided to seal the container prior to its ejection from the cleaner, thus to prevent dust and other material from leaving the container during or after ejection. Such a container is disclosed in U.S. Patent No. 2,596,808, and a cleaner for automatically ejecting it is shown in the copending application of Gustaf Einar Lofgren, Robert C. Lampe and John T. Ferraris, Serial No. 140,394, issued as Patent No. 2,641,330 on June 9, 1953, and owned by applicants' assignee.

It is accordingly among the objects of this invention to provide apparatus for rapidly and efficiently producing such self-sealing containers.

In the practice of one form of our invention, a cardboard web is fed into a stamping machine which blanks out oblong discs with a central aperture, and these discs are suitably disposed in a hopper. The discs are serially fed as, for example, by an endless belt from the hopper, and an adhesive is applied to one side of each disc. While the discs are being coated with adhesive, a web of thin rubber is metered from a supply roll and led to a cutting device which cuts off successive rubber strips. The rubber web is, however, fed at a velocity which is less than the velocity of the discs, with the result that the length of the rubber strip is less than that of the disc. As the successive rubber strips are cut, they are carried against the coated face of the discs, respectively, and are adhered thereto, while at the same time a small aperture is cut in each rubber strip, this aperture registering with the one in the disc, but being smaller.

After the rubber strip is pasted or glued to its disc, the disc continues to travel through the machine to a station whereat a disc of tag stock, that is, lightweight cardboard conforming in size and shape to the cardboard disc, is applied to the coated surface of the disc. The thusly completed disc is then fed to a receiving hopper, or may be fed directly into a machine wherein each disc is glued to the specially prepared open end of a porous paper container, thus to complete the container. If desired the disc may be manually glued to the container.

In the drawing, wherein is illustrated a machine in accordance with our invention:

Figure 1 is a diagrammatic side elevation of one form of the machine;

Figures 2–7 illustrate successive steps performed by the machine of Fig. 1;

Figure 8 is a diagrammatic perspective view of the apparatus by which the rubber is cut into strips;

Figure 9 is a side elevation of the rubber web feeding mechanism showing the drive mechanism;

Figure 10 is an enlarged fragmentary sectional elevation taken along the line 10—10 of Figure 11 and showing certain details of the drum which both cuts and feeds the rubber strips;

Figure 11 is a staggered section taken along the line 11—11 of Figure 10;

Figure 11a is a fragmentary perspective view of the element shown in Figure 11; and Figure 12 is a fragmentary top plan view of a portion of the lower roller shown in Figure 8.

Similar reference characters refer to similar parts throughout the views of the drawing.

Referring now to Figure 1, the machine in general includes two spaced parallel endless chains 20 which are driven in the direction of the arrow beneath a hopper 21 in which is stored a supply of cardboard discs D. The chains feed the discs from the hopper under a coating device generally indicated at 22 which coats the top side of each disc with suitable adhesive as it passes thereunder. Generally indicated at 23 is a rubber strip feeding mechanism which cuts successive strips S (see Fig. 4) from a rubber web R and applies them to the coated faces of discs D successively as the discs travel beneath the mechanism 23. At 24 we have generally indicated a mechanism including a hopper 25 which receives a store of tag stock discs T, these tag stock discs being serially fed from their hopper through a coating device 26 by means of a chain 27 having pickers 27a downwardly to chains 20 where the tag stock discs are successively glued to the tops of the underpassing discs D. The thus assembled discs pass through pressure rollers 28 either to a storage hopper or directly to a machine (not shown) where they are applied to the specially prepared open ends of porous bags or containers thus to complete the disposable dust container.

More particularly, chains 20 are trained about sprockets 29 and 30, either of which may be driven in any suitable manner to impart clockwise velocity to the belt. Preferably chains 20 are provided with a series of pickers 31, each opposed pair of which, as they pass beneath hopper 21, pick up one disc D and feed it from left to right, as viewed in Figure 1, toward coating device 22. This device includes a glue pot 32, a pickup roller 33, a transfer roller 34 and an applicator or printing roller 35, the transfer roller being in engagement with the pickup and applicator rollers 33 and 35. Thus, as each disc passes beneath applicator roller 35, its upper surface, or at least that portion which receives strip S, is coated with the adhesive material from glue pot 32. Disposed beneath applicator roller 35 is a pair of idler supporting sprockets 36 for supporting chains 20 and accordingly disc D against the downward pressure of applicator roller 35 as the disc passes thereunder. Roller 35, sprockets 36 and chains 20 accordingly coact in advancing the disc through the device 22 toward the rubber strip feeding mechanism 23.

This rubber strip applying device 23 is more clearly shown in Figure 8. Here it will be seen that the rubber web R is fed from a supply roll 37 mounted in any suitable manner as on an axle 38. If desired a braking device (not shown) may be applied to prevent free rotation of the supply roll 37. Disposed below and preferably to one side of the center of axle 38 is a driven metering roller 39 and also an idling pressure roller 40, the latter roller pressing the rubber web R against the metering roller. As will be described hereinafter, metering roller 39 drives web R at a velocity somewhat less than the velocity of discs D (Figure 1).

Disposed below the rollers 39 and 40 is another pair of rollers 41 and 42, the former of which is hollow ground and idles on an axis inclined with respect to the axis of roller 42. The roller 41 is mounted on an arm 41' journaled on the shaft 67, and the arm is engaged by a spring 41" which tends to swing the arm in a direction to move the roller 41 towards the roller 42. These two rollers do not engage because of a stop 41a shown in Fig. 9, which maintains a minimum spacing between the rollers slightly in excess of the thickness of rubber web R, and the inclination of roller 41 is such that when the rubber web lies between these two rollers 41 and 42 there would be a substantially straight line contact between the hollow ground surface of roller 41 and the rubber web were they in engagement. This roller 41 accordingly comprises in effect a cutting block, as will be described.

Roller 42 is a somewhat complex mechanism that not only cuts the rubber web R into strips of the proper length, but also carries each severed strip S downwardly against disc D for application to the coated side thereof, the disc being appropriately supported by an underlying roller 43 which is driven in synchronism with roller 42. The roller 43 also carries a series of dies, such as die 44 (Figures 8 and 12), which extend into the central apertures in the discs D and cut the oblong holes H in the strips during the application thereof to the discs, the roller 42 being provided with hardened backing plates 45 (Figures 8, 11 and 11a) against which the dies 44 engage successively, thus to facilitate cutting the holes H.

In order to cut successive strips from rubber web R, roller 42 is provided with a series of knives 46, preferably spaced around roller 42 in quadrature. As is more clearly shown in Figure 11, a series of grooves 47 are cut in the periphery of roller 42, and in each of these grooves is received a knife blade 46, the knife being held in the groove by a wedging strip 48 and screw 49. Thus, as roller 42 (Figure 8) rotates counter-clockwise, each of the knives 42 eventually reaches approximately the 9 o'clock position, where it bears against the backing roller 41, and accordingly cuts through web R to form a length of material or rubber strip S from the web. For efficient operation, the edge of each blade projects beyond the periphery of roller 42 by an amount substantially equal to the spacing between rollers 41 and 42 as determined by stop 41a, so that when the blade engages the rubber, the rubber is severed by a sort of rolling squeezing action.

After the strip S is severed from the web R it is, of course, necessary to transport it downwardly to the point where it is applied to the coated surface of disc D, and to this end roller 42 is provided with suction and pressure passages which will now be described. As shown in Figure 10, roller 42 includes a main body portion 50 and hub portions 51 and 52, the former of which is pinned to a shaft 53, by which the roller is driven. The right-hand face, as viewed in Fig. 10, of roller body 50 is recessed to receive a cap 54 having a hub 55 mounted on roller hub 52, the cap being held against rotation in any suitable manner as, for example, by a pin 56 or the like secured to the machine frame (not shown) and extending into a suitable hole or slot in the cap. Thus, roller 42 will rotate relative to cap 54. The inner surface of cap 54, as shown in Figure 11, is milled to provide two channels 57 and 58, provided respectively with connections 59 and 60 to pressure and exhaust lines. In roller body 50, adjacent each of blades 46, is formed a transverse air duct 61 which, as shown in Figure 10, is closed at one end and open at the other, and registers successively with chambers 63 and 62 (Figure 11) in cap 54 as roller body 50 rotates. Thus each duct 61, during rotation of roller 42, first communicates with exhaust chamber 63 and then with pressure chamber 62. Each duct 61 also communicates with atmosphere by way of drilled holes 64 (see also Fig. 11a) just ahead of a blade 46 in the direction of rotation of roller 42 and hence these holes successively exert negative and positive air pressure. There are four of these ducts 61 formed in the roller body. Additionally, there are provided four intermediate ducts, such as duct 65, which are located on the same radius as ducts 61, but substantially midway between adjacent knife blades 46, and communicate with atmosphere by way of holes 66 (see also Fig. 11a), which are similar to holes 64 and are located preferably about midway of adjacent blades 46. It accordingly follows that as roller 42 rotates relative to cap 54, duct 65 (Figure 11) registers with the upper end of exhaust chamber 63, and accordingly communicates therewith until it leaves the lower end of the chamber. Before this occurs, however, succeeding duct 61 registers with the chamber so that each of the ducts 61 and 65 are under negative pressure, creating a suction effect at the outer ends of holes 64 and 66, respectively. If then the rubber web R (Figure 8) is adjacent the periphery of the roller 42 while the two ducts are in communcation with chamber 63, the rubber will be sucked tightly against the periphery of the roller and carried around with it.

When duct 65 registers with chamber 62 (Figure 11), at which time the leading end of the severed strip S is at the 6 o'clock position, positive air pressure is exerted at the openings of holes 66, forcing the leading end of the rubber strip away from the periphery of the roller and against the adhesive surface of the disc D, thus in effect permitting the strip to be peeled from the roller as it continues to rotate. Then when the following duct 61 (Figure 11) registers with chamber 62, its holes 64 exert a positive pressure, thus freeing the trailing end of the strip from the periphery of the roller, and accordingly assuring its adhesion to the coated disc D. As previously mentioned, of course, the die 44 cuts the hole H in the rubber strip when it reaches the 6 o'clock position. As hereinabove noted, rollers 39, 42 and 43 are positively driven, the driving mechanism for these rollers being shown in Figure 9. Thus, metering roller 39 is fastened to a shaft 67, to which shaft is also secured a gear 68. This gear meshes with a gear 69, fastened to shaft 53, to which roller 42 is attached. Gear 69, in turn, meshes with a gear 71 fastened to a shaft 72, to which roller 43 is attached, and this latter gear 71 may be driven by any suitable means. The gears 71, 69 and 68 are of the same diameter, and accordingly their respective rollers 43, 42 and 39 are driven at the same r.p.m. As rollers 42 and 43 are of the same diameter, their peripheral velocities are the same. Metering roller 39, however, is of lesser diameter, and hence has lesser pheripheral velocity, and this velocity is of lesser value than the velocity of belt 20 (Figure 1) and accordingly of discs D, the velocity of discs D being the same as the peripheral velocities of rollers 42 and 43. It accordingly follows that what might be termed the feed velocity of rubber web R (Figure 8) from metering roller 39 is less than the peripheral velocities of rollers 42 and 43 and the velocity of disc D. By reason of this factor, it is possible to apply to each of discs D a strip S whose length is shorter than that of disc D.

The operation of the rubber web feeding and applying mechanism 23 (Figure 8) will perhaps be best understood by describing how this portion of the entire machine is initially set into operation. A length of the web R is drawn from roll 37 and is threaded between rollers 39 and 40 and rollers 41 and 42, preferably with one of the knife blades 46 located in approximately the 9 o'clock position. If then the machine is put into operation, the air holes 64 and 66 in roller 42 which are located between the knife blades at the 9 o'clock and 6 o'clock positions will be at negative pressure and accordingly will tend to suck the web against the periphery of the roller. Then, as this roller rotates until the knife blade 46, which started at approximately the 9 o'clock position, comes against the backing roller 41 at the 9 o'clock position, that portion of the web will be sucked against the periphery of the roller. In the meantime, the holes 64 and 66 trailing the knife blade will be inactive. Just as the knife blade 46 passes the 9 o'clock position, where it cuts off the web by bearing against the backing roller 41, the next series of holes 66 will be at approximately the 10 o'clock position, where they exert neither negative nor positive pressure effect. Indeed, they cannot exert any pressure effect until they reach or just pass the 9 o'clock position, as hereinbefore described, where their duct 65 (Figure 11) registers with exhaust chamber 63. While this row of holes is traveling from the said 10 o'clock to the 9 o'clock position, metering roller 39 continues to feed web R between and through rollers 41 and 42 at such a velocity that its free end hangs below the 9 o'clock position when the next group of holes 66 reaches the 9 o'clock position. At this time, the group of holes 66 exerts negative pressure, and accordingly sucks the free end of the web against the periphery of roller 42, and as the roller continues to rotate holes 64 also exert negative pressure, by reason of their duct 61 (Figure 11) registering with exhaust chamber 63. This negative pressure obtains until the following knife blade 46 cuts off the next strip by bearing against backing roller 41.

At about the time this occurs, the leading end of the previously cut off strip S approaches the 6 o'clock position at which point the suction holes 66, or rather their duct 65, registers with the entrance end of pressure chamber 62. At this time the vacuum is cut off and positive pressure forces the leading end of the strip against the coated disc D which is being fed between rollers 42 and 43. Then when the duct 61 for the following holes 64 registers with the entrance end of pressure chamber 62, the strip S is completely released from the periphery of roller 42 so that the strip is securely pasted against the coated surface of disc D by the rollers 42 and 43.

From the foregoing, it will appear that the rubber web R is fed from the supply roll 37 by metering roller 39 at a velocity whose value is less than the peripheral velocities of rollers 42 and 43, and accordingly that of disc D. Hence it is possible to cut off and apply to disc D rubber strips S, the length of each of which is determinably less than that of disc D. In other words, the length of rubber strip S can be varied as desired by varying either the r.p.m. or the diameter of metering roller 39.

Following the application of a strip S to a disc D, the disc with strip attached continues to be advanced by the chains 20 and passes between rollers 26a and 26b. Each of these rollers is driven by suitable gearing so as to have a peripheral speed equal to the linear speed of the disc as advanced by the chains 20. Consequently, the chains 27, which are driven by the roller 26a, move at the same speed. As previously stated, these chains carry pickers 27a which pick up and move along with the chains a disc T of tag stock from the bottom of the stack of such discs in the hopper 25. The discs T are of the same configuration as the discs D, except that the center aperture is formed with a tongue extending thereacross having a weakened section at one end, as is shown in Fig. 6. The upper surface of each disc T is coated with adhesive by the printing roller 26c of the coating device 26. The coated disc is then carried by the chains 27 around the roller 26a, a curved plate 26d being provided for preventing the disc from falling off the chains, and meets a disc D being advanced by the chains 20. The two discs are pressed together by the rollers 26a and 26b and thus are adhered to each other with the previously applied rubber strip S between them.

The completed disc assembly is then advanced further by the chains 20 and may be passed between additional pressure rollers 28. These disc assemblies are now in condition to be secured in any suitable manner to bags of porous material to thus form complete dust containers of the type shown in the above-identified Lofgren patent.

We have accordingly provided apparatus for making containers in a thoroughly practical and efficient manner, but it is to be understood that the foregoing example has been given for the purpose of illustration only and are not to be considered as limiting the scope of our invention, which is to be determined by the appended claim.

We claim:

Apparatus for progressively cutting off material in a transverse cut with respect to the line of feed of the material, said apparatus comprising a frame, a cylindrical roller rotatably mounted on said frame, a cutting blade mounted on the periphery of said cylindrical roller in substantially parallel relation to the axis of the cylindrical roller with the cutting edge extending beyond the periphery of said cylindrical roller, a hollowground platen roller rotatably mounted on said frame in adjacent askew relation to the cylindrical roller for relative movement toward and away from the cylindrical roller along a path transverse to the axes of said rollers to cause said platen roller to maintain material in cutting relation to said cutting blade progressively from one end of the blade to the other and to produce a progressive severance of the material, said platen roller and cylindrical roller at the point of the progressive severance coacting to guide the material passing therebetween, means urging the platen roller toward the cylindrical roller, movement of said platen roller permitting a change in distance between said rollers when the cutting edge coacts with said platen roller during the arcuate cutting movement of the blade making a progressive cut from one end of the blade to the other end with the platen roller serving to maintain the portion of material being cut against the cutting blade with sufficient pressure to assure a complete cut, spacing means limiting the movement of the said platen roller along its path toward the cylindrical roller, the resulting spacing between the rollers providing a passageway for feeding unsevered strip material between the rollers after each cut.

References Cited in the file of this patent

UNITED STATES PATENTS

| | | |
|---|---|---|
| 390,167 | Hammerstein | Sept. 25, 1888 |
| 461,600 | West | Oct. 20, 1891 |
| 488,129 | Mendenhall | Dec. 13, 1892 |
| 709,408 | Jahnz | Sept. 16, 1902 |
| 1,252,932 | Norquest | Jan. 8, 1918 |
| 1,834,299 | Williams | Dec. 1, 1931 |
| 1,854,217 | Novick | Apr. 19, 1932 |
| 1,872,130 | Elliott | Aug. 16, 1932 |
| 1,983,323 | Stokes | Dec. 4, 1934 |
| 2,030,135 | Carpenter | Feb. 11, 1936 |
| 2,075,178 | Copeman | Mar. 30, 1937 |
| 2,126,804 | Overly | Aug. 16, 1938 |
| 2,202,496 | La Bombard | May 28, 1940 |
| 2,209,348 | Novick | July 30, 1940 |
| 2,254,217 | Grupe | Sept. 2, 1941 |
| 2,284,872 | Jaeger et al. | June 2, 1942 |
| 2,289,394 | Ungar | July 14, 1942 |
| 2,478,240 | Christman | Aug. 9, 1949 |
| 2,518,011 | Hoppe | Aug. 8, 1950 |
| 2,555,218 | Bailey | May 29, 1951 |
| 2,568,333 | Henschker et al. | Sept. 18, 1951 |

FOREIGN PATENTS

| | | |
|---|---|---|
| 670,171 | Germany | Jan. 13, 1939 |